UNITED STATES PATENT OFFICE.

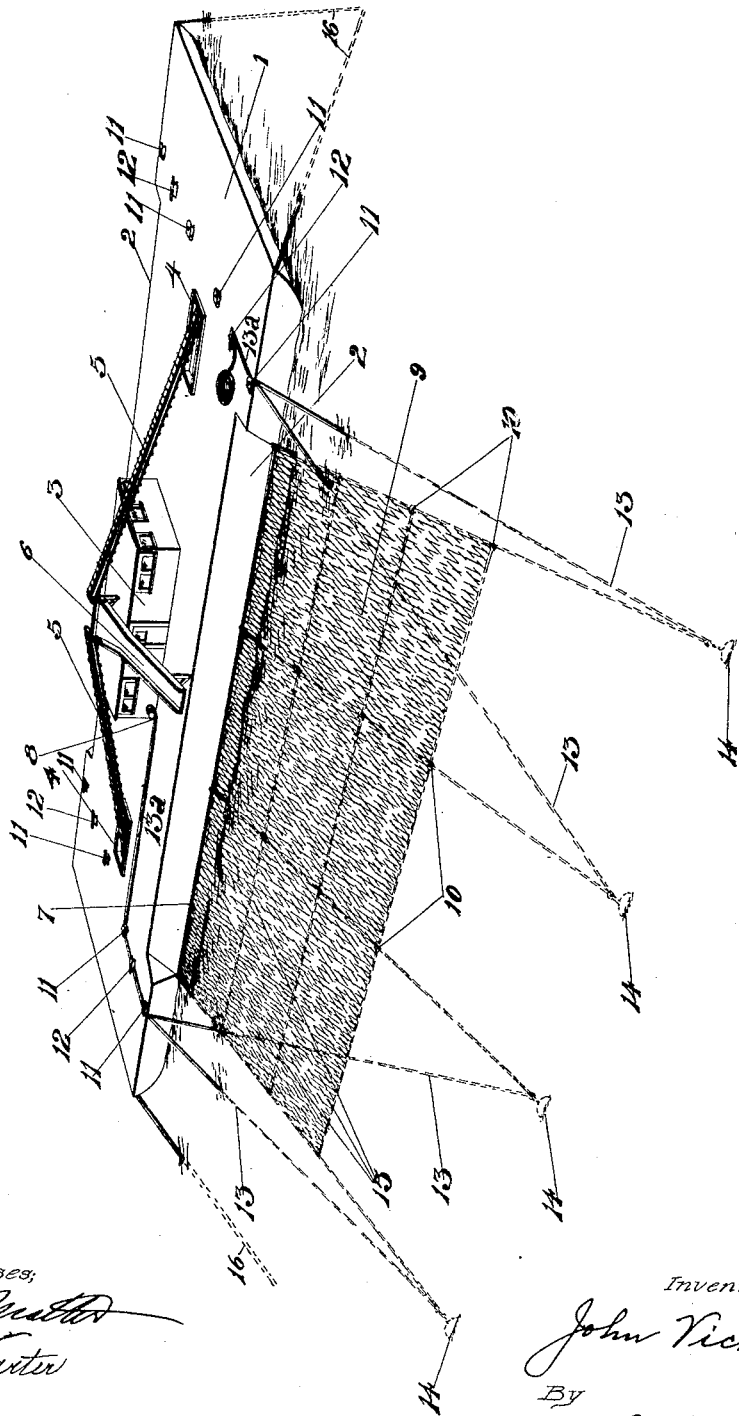

JOHN VICK, OF AFOGNAK, TERRITORY OF ALASKA.

FISH-FLOAT.

1,115,752.  Specification of Letters Patent.  Patented Nov. 3, 1914.

Application filed October 7, 1913. Serial No. 793,827.

*To all whom it may concern:*

Be it known that I, JOHN VICK, a citizen of the United States, residing at Afognak, Afognak Island, Alaska, have invented certain new and useful Improvements in Fish-Floats, of which the following is a specification.

This invention relates to fishing floats, and has for its object to provide in a float means for mechanically hauling-in a seine.

A further object is to provide a float having means by which a seine laden with its catch of fish may be easily hauled in over the side thereof; and also to provide a device by means of which the cargo thus taken aboard may be mechanically discharged into the transport, for shipment.

I accomplish the objects above indicated by means of the structure illustrated in the accompanying drawing, in which the figure is a perspective view of a flat boat constructed with a view to being equipped with my improved loading and unloading apparatus.

In the drawing, 1 designates a float, or flat boat having each of its sides cut away to form the recess 2, which extends well toward each end, and whose face is inclined at an angle of some 45 degrees to the deck of the boat, and extends to the water line. Centrally in the deck rises the cabin 3, which communicates with the hold below, in which is provided an engine of any approved type, to supply power for the purposes designed. In each end portion of the deck is formed a hatch way 4, through which the fish, unloaded from the seines upon the deck, will be scooped, into the hold below. Leading from the hold in each end, is an endless conveyer 5, extending through the hatch way approximately to the boat's center, above the cabin where it communicates with a chute 6 extending over one of the inclined recesses into the vessel into which the load is to be discharged.

Along the lower edge 7 of the recessed portion 2, are secured chains 13, each of which passes through a suitable pulley in a mush room anchor 14 lying at the bottom. At each end the chains connect with a portion 13ª leading to fair-leaders 11 and cleats 12, where they are made fast, and by means of which the chains are adjusted as desired. These members of the chain secured along the edge 7 of the boat, are provided with transverse stays 15 secured at 10; and upon these chains and stays is secured a net 9 which is of a width sufficient to reach a depth in the water beyond that reached by the seine, so that it will serve as a beach for hauling in the seine and prevent the fish from escaping therefrom. It also permits the haul to be easily drawn upon deck.

The device here shown and described is intended for use in salmon fishing. The seine, which is usually some 15 feet in width by several hundred feet in length, will be drawn by a tug, so as to intercept and surround the fish. Then at an opportune moment, when the fish head toward the float, the seine will be hauled in against the net 9. The lines will then be taken to the gipsy head and hove in. The gypsy head will be operated by the engine within the cabin, to wind up the line and the haul will be landed upon the deck, to be scooped into the hatches 4.

In discharging the load, the fish will be placed upon the conveyers 5, which are driven by the engine of the boat, to convey the fish to a point above the cabin where they are discharged into the chute 6. This chute is adapted to be placed in position from either side, and to incline from the conveyer to and beyond the side of the float, and into the vessel designed to receive them.

The float will be provided at each side with similar equipment so that operations may be conducted from the side that is most convenient, or from both sides at the same time, if desired.

Having described my invention, what I claim, is—

1. A fish float comprising a boat having the intermediate portion of its deck inclined outwardly to the water line, and a support secured along the lower edge of said inclined portion fixed approximately in the plane thereof.

2. A fish float comprising a boat having at each side a recessed portion inclining to the water line, a net secured along the lower edge of the recessed portion, and anchored at the bottom in the plane thereof, and means upon the boat for adjusting the lines of the net.

In testimony whereof, I affix my signature in presence of two witnesses.

JOHN VICK.

Witnesses:
  E. E. HECKBERT,
  HAZEL A. ARMSTRONG.

Copies of this patent may be obtained for five cents each, by addressing the "Commissioner of Patents, Washington, D. C."